United States Patent [19]

Izawa

[11] Patent Number: 5,385,371

[45] Date of Patent: Jan. 31, 1995

[54] MAP IN WHICH INFORMATION WHICH CAN BE CODED IS ARRANGED IN INVISIBLE STATE AND A METHOD FOR CODING THE CONTENT OF THE MAP

[76] Inventor: Michio Izawa, 6-15-408 Tsunashimahigashi 3-chome, Kohoku-ku, Yokohama, Kanagawa, Japan

[21] Appl. No.: 233,343

[22] Filed: Apr. 26, 1994

[30] Foreign Application Priority Data

Mar. 8, 1994 [JP] Japan .................................. 6-062157

[51] Int. Cl.⁶ .............................................. G09B 29/00
[52] U.S. Cl. ............................................. 283/34; 283/35
[58] Field of Search ......................... 283/34, 35, 115; 340/995; 40/904

[56] References Cited

U.S. PATENT DOCUMENTS

| | | | |
|---|---|---|---|
| 4,504,910 | 3/1985 | Araki et al. | 340/995 |
| 4,631,678 | 12/1986 | Angermuller et al. | 283/34 X |
| 4,888,699 | 12/1989 | Knoll et al. | 340/995 |

*Primary Examiner*—Willmon Fridie
*Attorney, Agent, or Firm*—Rogers & Killeen

[57] ABSTRACT

Objects of the present invention is to provide a method for coding indications on a printed map which is an analog map, namely, the content and location of a certain position directly from the analog map, and more particularly, to provide a method for coding a map formed so that the data to be recorded as digital map data and to be read from digital map data stored in a storage device can be formed easily and quickly, coding the content in the map of the indication and further coding the position thereof.

10 Claims, 4 Drawing Sheets

MAP IN WHICH INFORMATION WHICH CAN BE CODED IS ARRANGED IN INVISIBLE STATE AND A METHOD FOR CODING THE CONTENT OF THE MAP

BACKGROUND OF THE INVENTION

1. Field of the Invention

This invention relates to a map represented by, for example, a printing method for people to visually recognize the content thereof immediately with the naked eye, the map being formed so that the content of the indications of a road or the like which contain graphic representations, symbols, letters the like, and the position thereof can be coded and recorded, and further to a method for coding such map representations.

2. Description of Related Art

As a map which is carried during driving a vehicle or during a trip, conventionally, a map display unit which is capable of displaying a map on its display screen such as a LCD panel have been well known as well as a printed map of a variety of scales.

Particularly, a car navigation system which has been recently mounted on vehicles, displays a map on the LCD screen so as to allow people to grasp the displayed map with the same visual sensitivity as when they see a printed map (hereinafter referred to analog map). The data indicating the content of a map which is coded by digital values and is memorized in a storage device is read and, for example, the map of a subject area is displayed on the aforementioned screen substantially in the same manner as in the printed map so that people can see the displayed map according to the same visual sensitivity as when they see the analog map. In order to display the information about on what point on the displayed map and in which direction a vehicle incorporating this navigation system is travelling, the position of the aforementioned vehicle is detected by means of an artificial satellite, beacon or the like and displayed on the map displayed on the aforementioned screen.

However, it is not easy to produce the data necessary for digitizing the data of the analog map. Additionally, because a large amount of information represented according to different scales are required for a map of even the same area, depending on the purpose of use of the map, the amount of data necessary for the digitized map is very huge. Thus, it takes quite complicated steps to read a subject map data from various map data stored in the storage device and then display the map data of a desired scale of a desired area on the display screen.

Accordingly, if it is possible to specify an area which is desired to be displayed, immediately, according to the analog map, a location or a place which is desired to be displayed can be displayed on the display screen of the car navigation system without any complicated procedure. Thus, such system is considered to be very useful. If a method in which an analog map is recorded as map data more easily than in conventional methods can be realized, the versatility of the system is enhanced in addition to ease of the display operation.

SUMMARY OF THE INVENTION

Accordingly, objects of the present invention is to provide a method for coding indications on a printed map which is an analog map, namely, the content and location of a certain position directly from the analog map data, and more particularly, to provide a method for coding a map formed so that the data to be recorded as digital map data and to be read from digital map data stored in a storage device can be formed easily and quickly, coding the content of the indication in the map and further coding the position thereof.

According to the present invention, there is provided a method in which an invisible code which indicates the content of an indication on the map and the location thereof is formed on a map represented so as to be recognized with the naked eye, the invisible code being able to be read by a reading means for the codes.

According to another aspect of the invention, there is provided a method in which an invisible code which corresponds to the content of the indication selected appropriately from the representation of the map, and the location thereof are assigned to a map represented by printing and in which the codes are read by a reading means in order to code the content of the aforementioned representation and the location thereof.

The invisible bar code which indicates the content of an indication in the map and the location thereof, is formed on the road and a prominent location on or around the road in an ordinary printed map. As required, a visible mark which indicates that the aforementioned invisible code has been assigned, are presented. Thus, the indication of the aforementioned invisible code or the combination of the invisible code and the visible mark do not prevent people from recognizing the content of the indication on an analog map, so that such a map can be used in the same manner as the conventional map. On the other hand, by reading the aforementioned invisible code according to a location desired to be displayed or the visible mark which acts as an index, it is possible to input data for recording the representations of the map such as roads or prominent locations contained in the analog map directly to a storage device such as a computer, and further to read such information to display it on the screen.

DESCRIPTION OF THE PREFERRED EMBODIMENTS

Figure 1:
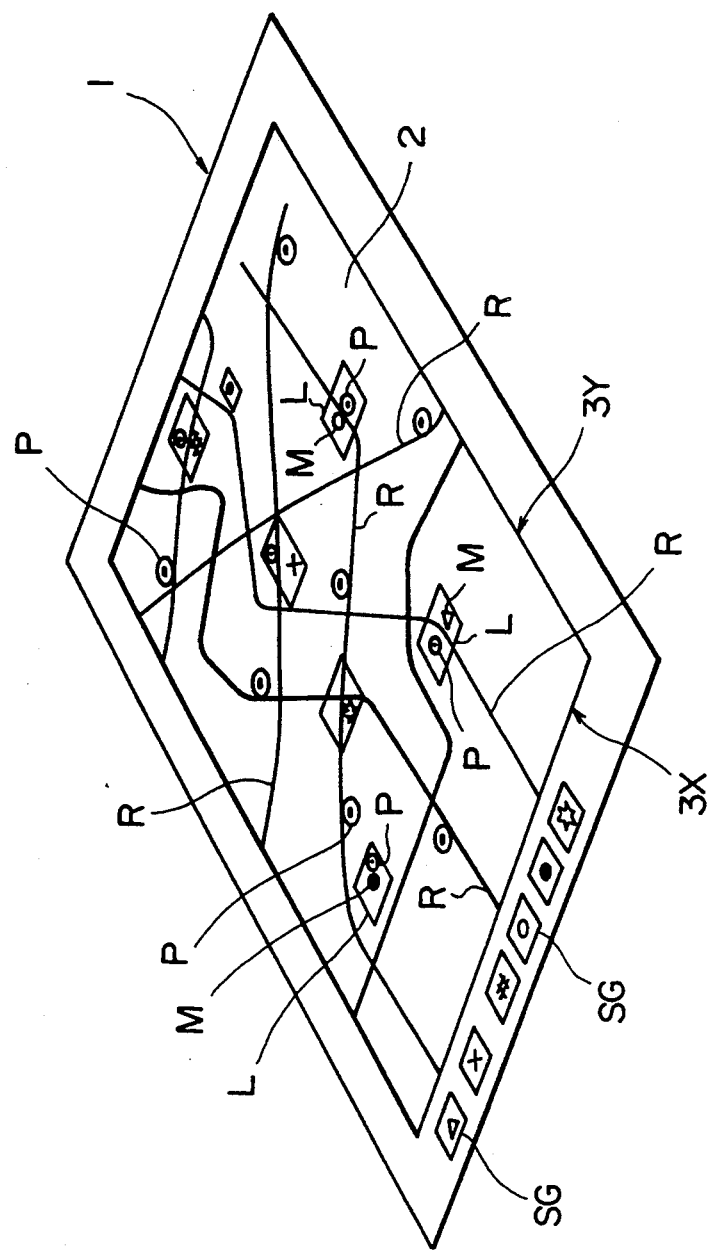
FIG. 1 is a perspective view of a map in which an arbitrary area is printed, the map being an example of the present invention.
Figure 2:
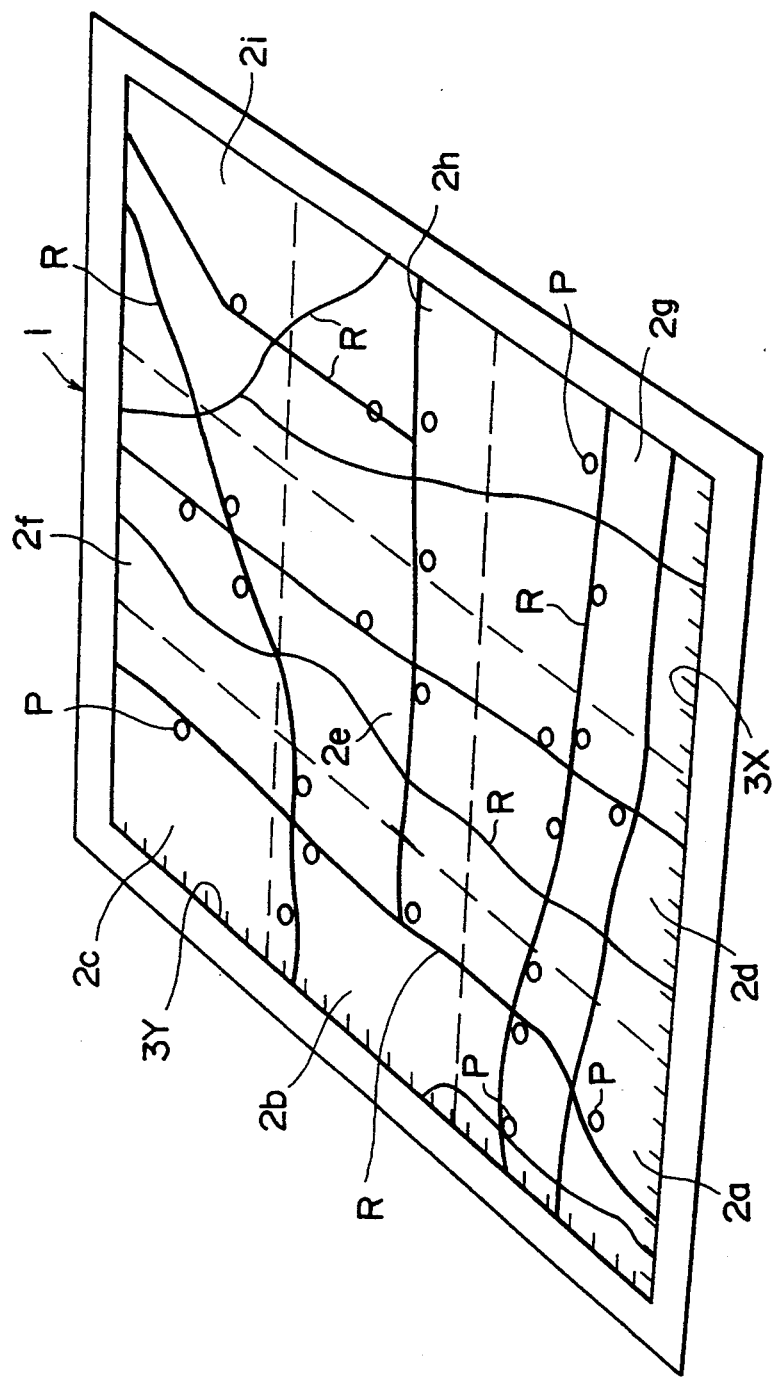
FIG. 2 is a perspective view of a map in which an arbitrary area is printed, the map being an example of the present invention.
Figure 3:
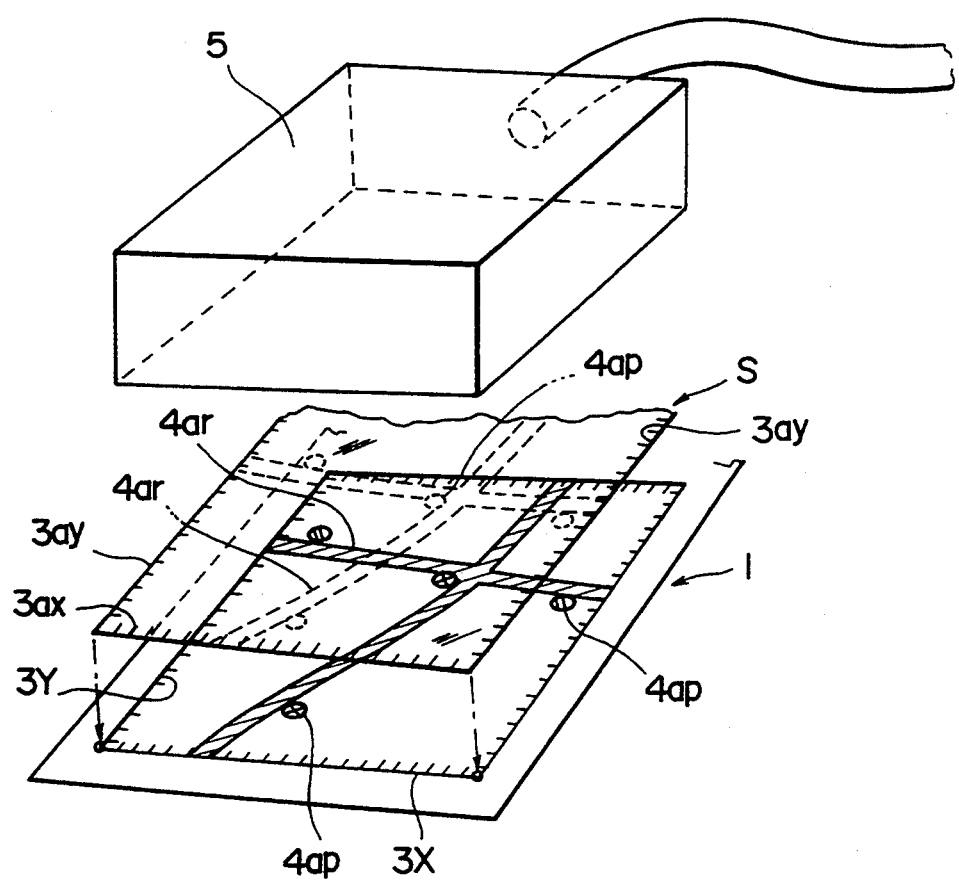
FIG. 3 is a perspective view showing the condition in which the content of an indication in a desired area are coded from the map shown in FIG. 2 and the code data is directly input to a computer.
Figure 4:
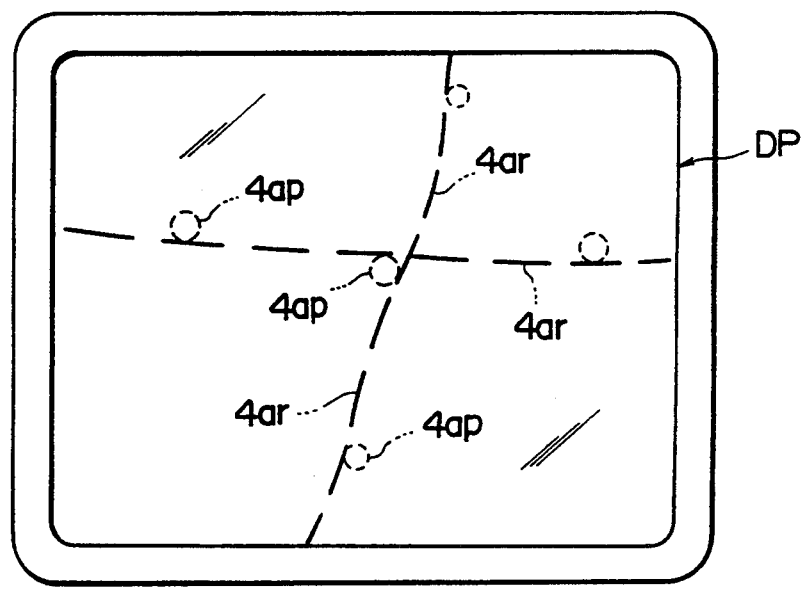
FIG. 4 is the front view of an example of the display screen.
Figure 5:
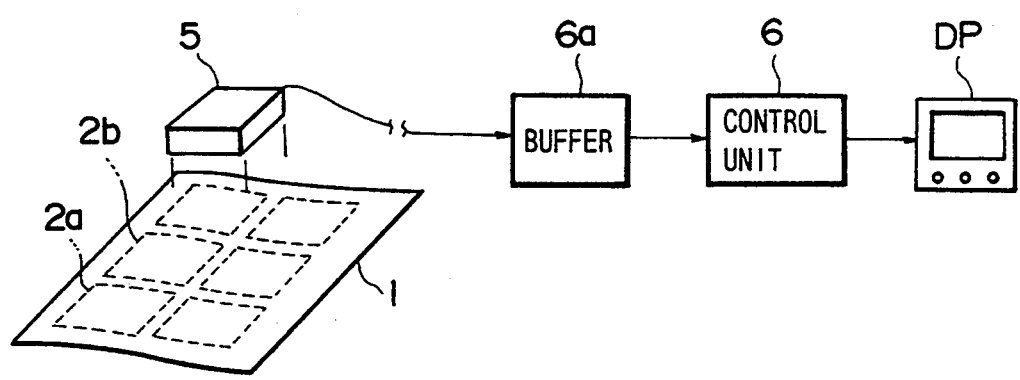
FIG. 5 is a system block diagram showing steps for reading map data according to the present invention.

Embodiments of the present invention will be described with reference to the accompanying drawings. FIGS. 1, 2 are examples of the present invention, each showing a perspective view of a printed map of an arbitrary area. FIG. 3 is a perspective view showing a condition in which the content of a desired area in the map 2 is coded and the coded data is directly input to a computer. FIG. 4 is a front view of an example of the display screen, and FIG. 5 is a system block diagram showing an example of the method for reading map data according to the present invention.

Referring to FIG. 1, reference numeral 1 designates a map printed according to an ordinary printing method. Assume that FIG. 1 contains divided sections in which the respective sections are represented separately, and sections magnified or reduced according to different scales are contained. In FIG. 1, the entire section 2 is determined by plane coordinates based on the X-axis and Y-axis, and some point is given codes 3X, 3Y which correspond to values, respectively, indicating a position from the home position with respect to the X-axis and Y-axis. Arbitrary positions in the entire area are formed so that they can be coded according to the position data in the aforementioned coordinates. The indication items on the map 1, for example, main roads R, prominent building or facility around or on the aforementioned road (hereinafter referred to as the mark P) are represented so that they can be coded by disposing an invisible code indicating each road R and each mark P, and by disposing an invisible code indicating the position data of each road R and each mark P with respect to the aforementioned coordinates. Thus, according to the map of the present invention, the indication content coded by a two-dimensional code symbol or a two-dimensional automatic recognition symbol in the aforementioned map 1 is stored in a storage device such as a computer by reading the aforementioned invisible codes, and the stored data is read from the storage device. This operation will be described below.

Map data to be stored in the storage device according to the aforementioned method is an example of digitized map data which is coded according to the method of the present invention. In the known car navigation system, the content of a selected and specified division map is displayed on the display screen by inputting a code corresponding to any section in the aforementioned map 1 by voice or through a keyboard. However, if map information is recorded and read according to a method of the prior art, it takes a quite number of operating steps and time to select a specific section. For example, if Kanto area is selected from Japanese map, and then Tokyo area is read from the storage device and displayed on the screen, it requires a number of steps, thereby taking a quite number of time.

According to the present invention, the meaning and content of each selected mark P and further, data indicating the position of the mark P on the map are established on an arbitrarily selected mark P, which may be a prominent intersecting point, marked building, gas station or the like, located on or in the neighborhood of a main road R, by means of an invisible code like a Sterus code (brand), so that the code is placed on the mark P. According to an example of the present invention, a visible mark M which indicates that each mark P is coded, and an outline mark L which indicates a range (position) to which the aforementioned invisible code has been assigned are indicated on the aforementioned printed map 1. It is desirable to form the outline mark L in the form of a protruded guide frame to prevent the reading position of a scanner 5, which will be described as an example of a reading means for the aforementioned code, from being slipped. SG is a symbol guide which indicates the meaning and content of a visible mark M represented on the edge space of the map 1.

Each mark P formed on the map 1 and each invisible code for indicating the position of the mark P are set so as to correspond to a position with respect to the map, in which the invisible code has been assigned and in which the mark P is indicated. If any invisible code is read by means of a scanner 5 by regarding a certain visible mark as an index, the read code signal can be used so as to function as a reading signal for map data (this data is stored in a storage device prepared separately) related to the map 1. This operation will be described below.

When displaying the content of the map of an area near a certain mark P in the map 1, the invisible code which is given to a mark P is read by means of a reading means (scanner 5) with the help of the mark M belonging to the mark P in the map 1. The read data acts as such a signal for requesting a corresponding map data contained in a computer or the like to be read and displayed. From map data stored in the storage device of the computer, map data of a subject section is retrieved on the premise that map data has data about the same position as the read data, and then the corresponding map data is displayed on the display screen.

As described above, in the map according to the present invention, marks are set in the section which is desired to be displayed, and invisible codes which indicate set marks P and the positions of the marks P are assigned to the map. Thus, by reading a code corresponding to a mark P, it is possible to retrieve the data of the area from a tremendous amount of data stored in the computer, in which the mark P is indicated, by a single operation.

On the other hand, the entire area of the map 1 shown in FIG. 2 is divided to nine sections, 2a–2i, as shown in FIG. 2. The respective sections contain roads R and marks P such as a prominent park, building, intersecting point or the like which are located on the roads R. Then, the position data which represents each road R or each mark P and which indicates the position of the road R or the mark P is established by printing on a transparent sheet S, in the form of an invisible code such as Sterus code (brand) as shown in FIG. 3, and then the transparent sheet is placed on the aforementioned printed map. As described above, according to the second aspect of the present invention, an invisible code which indicates each road R or a set mark P, and an invisible code which indicates the position data of each road R and mark P with respect to the X-Y coordinates are assigned to the map.

According to the second embodiment of the present invention, in the respective sections 2a–2i of the analog mad shown in FIG. 2, invisible codes 4ar–4ir, 4ap–4ip, which indicate marks P such as roads or prominent objects on the roads, for example, representative or symbolic buildings, intersecting points or the like, and invisible codes 3ax–3ix, 3ay–3iy, which indicate the position data of respective marks P such as roads, buildings, intersecting points or the like, are given to the map by placing the sheet S on the printed map. Thus, when displaying, for example, the first section 2a in the map 1 shown in FIG. 2 on the display screen, the scanner 5 is placed on a desired section 2a of the map 1 on which the sheet S is placed for the respective invisible codes 4ar, 4ap, 3ax and 3ay to be read.

After the scanner 5 reads the invisible codes 4ar, 4ay, 3ax and 3ay in the section 2a, the read data is sent to the computer 6. The read data includes the data which means the road R or the mark P in the section 2a and the position data thereof.

The computer 6 retrieves the same map data as the data read by the scanner 5 from the section 2a from map data containing the sections 2a–2i which have been input preliminarily by an appropriate method, such as a conventional method, and then extracts the map data of the section 2a and displays it on the display screen. FIG. 4 shows an example of a map displayed according to the data of the section 2a.

In the analog map 1 which is printed according to the present invention, invisible codes 4at–4it, 4ap–4ip and 3ax –3ix, 3ay–3iy are assigned to subject roads R, marks and data indicating the positions thereof. The assigned codes are read by means of a scanner 5 and the read data is transmitted to the computer 6. The computer 6 retrieves a map data containing data read by the scanner 5 from map data preliminarily stored therein and displays it immediately on the display screen. Thus, the system of the present invention makes it possible to display a subject map without complicated procedures which are required in conventional car navigation system. Reference numeral 6 designates a buffer circuit for data read by the scanner.

According to the present invention, it is possible to code all map information represented on a printed map directly, input and store the coded information in a storage device such as a computer. Further, the system can be constructed so as to retrieve the map of a desired area and display it on the display screen. These advantages will be described below.

First, in a printed map of an arbitrary area, position data with respect to the X-Y coordinates are assigned to the units of minute area by the aforementioned invisible codes. Invisible codes are assigned to main roads in the map and along the main roads R by printing or the like. Further, the marks P such as marked buildings, intersecting points, gas stations or the like which exist on the roads R to which the invisible codes are assigned, are given invisible codes which are capable of distinguishing such individual objects.

As described above, a single printed map is an analog map which is represented by a known ordinary printing method and can be recognized visually, and further, at the same time, is formed as a digital map in which invisible codes which cannot be discriminated with the naked eye are assigned to roads R and marks P.

In the map according to the present invention, the indication area is divided to appropriate minute areas, and invisible codes assigned to the roads R, marks P and the position data thereof in each area are read by a scanner. The read data is memorized in the storage device such as a computer. The read data of a single section is magnified or reduced according to the reduced scale of the map to be displayed, so that a plurality of data are operated and memorized in the computer. In this manner, it is possible to record digital mad data at one time only by scanning the analog map.

When reading any section in the printed map to display it, a scanner is placed on an arbitrary road R or mark P in a desired division of the map to read the data of that portion. The read data is supplied to a storage device such as a computer. The supplied data is compared with data stored preliminarily in the storage device, and a map data containing the data which coincides with the supplied data, namely, the map data of the section which includes a road R or a mark P read by the scanner, is retrieved. Also it is possible to preliminarily set invisible codes (for example, a code which is a header for displaying a section) which coincide with respective sections and are used for reading and displaying the sections and then to retrieve a desired section from the map data stored in the computer 6 by reading its code and supplying the code to the computer 6.

If a corresponding data is retrieved, a preliminarily stored road R is displayed on the display screen in the form for example, a line or dotted line. Also, a mark P meaning a facility or the like located on the road is displayed by an indication mark determined so as to mean the mark P, so that the mark is located on a road indicated by the aforementioned line or dotted line. The map displayed on the screen contains only necessary elements in the printed map (road R and marks P on the road), and therefore the map can be recognized easily to discriminate such roads and marks.

According to the present invention described above, the invisible codes which indicate the content of the indication and the position thereof are assigned to appropriate indication positions on an ordinary printed map. In this manner, it is possible to read the content and the location of a marked position by the aforementioned code reading means. Thus, it possible to code the indications on the map as well as the location thereof without damaging the applicability and function as an ordinary printed map and further facilitate the reading and recording of the codes.

Thus, if the map of the present invention is used for reading a map desired to be displayed in the car navigation system, it is possible to retrieve and read a desired map data without a complicated procedure which is required in conventional system.

What is claimed is:

1. A map display system comprising:
   a map with visible features thereon, said map having blocks of encoded information not visible to the naked eye, each of said blocks of encoded information being associated with one of said visible features and including an identification thereof;
   a data store for storing digital data representing said map and including additional digital data representing additional features not visible on said map;
   a map scanner for reading said blocks of encoded information and for providing to said data store the information encoded therein; and
   a monitor for displaying a portion of said map represented by said digital data responsive to identification of a visible feature by said map scanner, and for displaying said additional features represented by said additional digital data, the displayed portion of said map and said additional features having a smaller scale than said map and including the one of said visible features identified by said map scanner.

2. The system of claim 1 wherein said visible features that have one of said blocks of encoded information associated therewith are indicated on said map with a visible symbol.

3. The system of claim 1 wherein said map further comprises visible perimeters around the ones of said visible features that have one of said blocks of encoded information associated therewith, said visible perimeters indicating a portion of said map that will be displayed by said monitor when the visible feature therein is identified by said map scanner.

4. The system of claim 1 where said map comprises a printed sheet with said visible features thereon and a transparent sheet with said blocks of encoded information thereon.

5. The system of claim 1 wherein said map further comprises visible grid marks indicating a portion of said map that will be displayed by said monitor when a visible feature therein is identified by said map scanner.

6. A map display system comprising:
- a transparent sheet for covering a printed map with visible features thereon, said transparent sheet having blocks of encoded information thereon, each of said blocks of encoded information being associated with one of the visible features and including an identification thereof;
- a data store for storing digital data representing the map to be covered by said transparent sheet, said data store comprising additional digital data representing additional features not visible on the map;
- a map scanner for reading said blocks of encoded information and for providing to said data store the information encoded therein; and
- a monitor for displaying a portion of the map represented by said digital data responsive to identification of a visible feature by said map scanner, and for displaying said additional features represented by said additional digital data,
- the portion of the map and said additional features displayed on said monitor having a smaller scale than the map and including the one of the visible features identified by said map scanner.

7. The system of claim 6 wherein said transparent sheet comprises projections for resisting movement of said map scanner when said map scanner is placed on said transparent sheet.

8. A method of displaying a map comprising the steps of:
- (a) providing a map with visible features thereon;
- (b) adding to the map blocks of encoded information not visible to the naked eye, each of the blocks of encoded information being associated with one of the visible features and including an identification thereof;
- (c) storing digital data representing the map;
- (d) storing additional digital data representing additional features not visible on the map within the boundaries of the map;
- (e) identifying one of the visible features by reading one of the blocks of encoded information; and
- (f) displaying a portion of the map represented by the digital data responsive to identification of a visible feature, and displaying therewith the additional features represented by the additional digital data, the displayed portion of the map having a smaller scale than the map and including the identified visible feature.

9. The method of claim 8 further comprising the step of adding a visible symbol on the map where a visible feature has been associated with a block of encoded information.

10. The method of claim 8 wherein the map includes a printed sheet and a transparent sheet, the visible features being provided on the printed sheet and the blocks of encoded information being added to the transparent sheet.

* * * * *